United States Patent
Fritz et al.

(10) Patent No.: US 7,661,663 B2
(45) Date of Patent: Feb. 16, 2010

(54) VIBRATION DAMPER HAVING A BUFFER SPRING

(75) Inventors: Michael Fritz, Breckerfeld (DE); Uwe Klein, Wuppertal (DE)

(73) Assignee: Thyssenkrupp Bilstein Suspension GmbH, Ennepetal (DE)

( * ) Notice: Subject to any disclaimer, the term of this patent is extended or adjusted under 35 U.S.C. 154(b) by 559 days.

(21) Appl. No.: 11/455,498

(22) Filed: Jun. 19, 2006

(65) Prior Publication Data
US 2007/0007092 A1    Jan. 11, 2007

(30) Foreign Application Priority Data
Jul. 8, 2005    (DE) .................... 10 2005 031 939

(51) Int. Cl.
*F16F 9/00* (2006.01)
(52) U.S. Cl. .................................. 267/221; 188/316
(58) Field of Classification Search .................... 267/33, 267/34, 170, 174, 221–226, 286–291; 188/316, 188/322.15, 322.22
See application file for complete search history.

(56) References Cited

U.S. PATENT DOCUMENTS

| 1,631,039 | A | * | 5/1927 | Landis | .......................... 267/223 |
|---|---|---|---|---|---|
| 3,806,105 | A | * | 4/1974 | Konishi et al. | .............. 267/116 |
| 4,535,876 | A | * | 8/1985 | Taylor | .................... 188/322.14 |
| 4,796,871 | A | * | 1/1989 | Bauer et al. | .............. 267/64.11 |
| 5,044,614 | A | * | 9/1991 | Rau | ........................... 267/221 |
| 5,667,041 | A | * | 9/1997 | Jensen | ........................ 188/284 |
| 7,032,727 | B2 | * | 4/2006 | Vanspauwen | ............... 188/284 |
| 7,240,776 | B2 | * | 7/2007 | Murata | ................... 188/322.14 |
| 2004/0060787 | A1 | * | 4/2004 | Nakamura et al. | .......... 188/316 |

FOREIGN PATENT DOCUMENTS

DE    196 26 143    1/1998

* cited by examiner

*Primary Examiner*—Christopher P Schwartz
(74) *Attorney, Agent, or Firm*—Jordan and Hamburg LLP

(57) ABSTRACT

A vibration damper is disclosed which includes a damper tube filled with a damping medium; a piston rod which can move in an oscillating and reciprocal manner in the damper tube and one end of which protrudes into the damper tube and which comprises at this end a piston rod extension and a shoulder. A piston divides the interior of the damper tube into a working chamber remote from the piston rod and a piston rod-side working chamber and which is disposed coaxially with respect to the piston rod extension and comprises restrictor openings and at least one spring washer covering these restrictor openings in each working chamber. A buffer spring is disposed in the piston rod-side working chamber.

10 Claims, 3 Drawing Sheets

VIBRATION DAMPER HAVING A BUFFER SPRING

BACKGROUND OF THE INVENTION

The invention relates to a vibration damper having: a damper tube filled with a damping medium; a piston rod which can move in an oscillating and reciprocal manner in the damper tube and one end of which protrudes into the damper tube and which comprises at this end a piston rod extension and a shoulder; a piston which divides the interior of the damper tube into a working chamber remote from the piston rod and a piston rod-side working chamber and which is disposed coaxially with respect to the piston rod extension and comprises restrictor openings and at least one spring washer covering these restrictor openings in each working chamber; a buffer spring disposed in the piston rod-side working chamber; and also a spring collar which is disposed in the piston rod-side working chamber and has a first support surface supporting the buffer spring and a second support surface for the at least one spring washer disposed in the piston rod-side working chamber.

A vibration damper of this type is known from DE 196 26 143 C2. In this known vibration damper a buffer in the form of a buffer spring is disposed in the upper working chamber concentrically with respect to the piston rod. The buffer spring is centred in the guiding direction of the piston rod by a spring collar which can possibly comprise an inner slip ring in order to allow only minimal frictional forces to occur during relative movement with respect to the piston rod. The other end of the buffer spring lies against a bearing of a disc body. This disc body forms the spring collar in terms of the present invention and is braced on a pin of the piston rod together with the piston. The disc body comprises, on its side remote from the buffer spring, a support surface for the spring washers disposed in the piston rod-side working chamber.

A disadvantage in the known vibration damper resides in the fact that forces exerted by the buffer spring onto the disc body (the spring collar) are introduced directly into the working piston via the piston rod-side spring washers. As a result, the damping characteristic of the damping piston is negatively influenced. Furthermore, the forces exerted by the buffer spring onto the disc body (the spring collar) flow into the pin of the piston rod via the working piston which can lead to problems in terms of stability in the region of the pin. In extreme cases, deformation or even separation of the pin can occur in the case of high buffer forces.

SUMMARY OF THE INVENTION

The object of the invention is to develop a vibration damper of the type mentioned in the introduction such that a force exerted by the buffer spring onto the spring collar does not cause the above-mentioned disadvantages and an installation space of maximum length is available for the buffer spring.

This object is achieved in accordance with the invention by virtue of the fact that the spring collar comprises a stepped bore which has a first bore section having a small diameter and a second bore section having a larger diameter, wherein the first bore section is allocated to the piston rod extension and the second bore section is allocated to the end of the piston rod, and that the spring collar is connected to the piston rod in a non-positive and/or positive locking manner so that a force exerted by the buffer spring onto the spring collar is introduced directly into the piston rod.

By virtue of the fact that a non-positive and/or positive locking connection is provided between the spring collar and the piston rod, a force exerted by the buffer spring onto the spring collar is introduced directly into the piston rod without the force being introduced onto the piston rod-side spring washers of the working piston and thus into the working piston itself. In this manner, forces emanating from the buffer spring do not have a disruptive influence on the damping characteristic of the working piston. Furthermore, high buffer forces are prevented from being introduced into the piston rod extension via the working piston. In this manner, possible deformations, damage or a possible separation of the piston rod extension are obviated.

By virtue of the fact that the spring collar comprises a stepped bore and that the bore section having the larger diameter covers the end of the piston rod over an axial length, a small axial installation height for the arrangement consisting of the piston rod, spring collar and buffer spring is achieved. For this purpose, the second bore section, i.e., the bore section of the stepped bore having the larger diameter, is preferably provided with an inner thread which co-operates with an outer thread provided on the end of the piston rod and forms a screw connection which is used to attach the spring collar to the piston rod.

In accordance with the invention, the spring collar is slid or screwed over the end of the piston rod with the bore section having the larger diameter so that the spring collar is made to rest against the shoulder on the end of the piston rod by means of a stop surface which is disposed in the transition region between the first and second bore sections of the stepped bore. The spring collar on this stop surface is supported against the corresponding shoulder on the end of the piston rod by means of the screw connection between the spring collar and the end of the piston rod.

Alternatively, the spring collar screwed onto the piston rod can lie with its end surface, remote from the piston, against a radial [lacuna] of the piston rod and can be supported on this shoulder. In this embodiment, the entire spring collar can have a smaller extension in the radial direction, i.e., it can have smaller diameters. As a result, the annular support surface, against which the buffer spring is supported, has a smaller diameter so that a closely wound buffer spring can be used which reduces the installation space and the weight.

In order to attach the piston on the piston rod extension, it is braced in a manner known per se between the second support surface of the spring collar on the one hand and a piston nut on the other hand by means of the piston nut screwed onto the piston rod extension.

If the shoulder of the end of the piston rod and the corresponding stop surface of the spring collar lying against this shoulder extend in the radial direction, then this contributes to a further reduction/minimisation of the axial installation height.

The spring collar in accordance with the invention comprises a guide surface extending in the axial direction for centring and guiding the buffer spring. In this manner, the buffer spring is reliably guided at least in the lower region, i.e., in the region facing the working piston.

In order to ensure that the spring collar lies with its stop surface against the shoulder on the end of the piston rod, the second bore section of the stepped bore is provided at its end facing the first bore section with a recess. In this manner, the recess ensures that radial space is available in which the end of the piston rod is received without the end of the piston rod in the radial direction coming into contact with the material of the spring collar. As a result, the stop surface of the spring collar can lie completely against the shoulder on the end of the piston rod.

In order to apply the necessary forces to screw the spring collar with the piston rod, a key surface is provided on the spring collar for attaching a screwing tool. Screwing tools include in particular wrenches but other screwing tools can be used which comprise a loop encompassing the tool to be screwed, wherein a frictional engagement is created between the loop and the tool in order to transfer the torsional moments required for the screwing process.

A cost-effective buffer spring is formed as a helical spring formed of wound steel wire. It is particularly advantageous if the thread of the spring collar, by means of which the spring collar is screwed to the piston rod, has a pitch oriented in the opposite direction to the winding direction of the buffer spring. If the buffer spring formed as a helical spring is a spring having a right winding, then the spring collar has a left thread and vice-versa. This is advantageous in that torsional moments exerted by the buffer spring onto the spring collar do not cause the spring collar to become unscrewed but rather act in the direction in which the spring collar is fixedly screwed to the piston rod. In this manner, the screw connection between the spring collar and the piston rod cannot be undesirably loosened.

In principle it is also feasible that the thread of the spring collar, by means of which the spring collar is screwed to the piston rod, has a pitch oriented in the same direction as the winding direction of the buffer spring. In this case, an additional lock against rotation should be provided on the spring collar and/or on the piston rod, by means of which the spring collar is reliably prevented from being unscrewed by the torsional moments transferred thereto by the buffer spring. The lock against rotation can be formed e.g., as a conventional non-positive and positive lock against rotation as used for example for nuts in nut and screw connections.

A preferred embodiment of the invention will be explained in detail hereinafter with the aid of the drawings.

DESCRIPTION OF THE PREFERRED EMBODIMENTS

Figure 1:
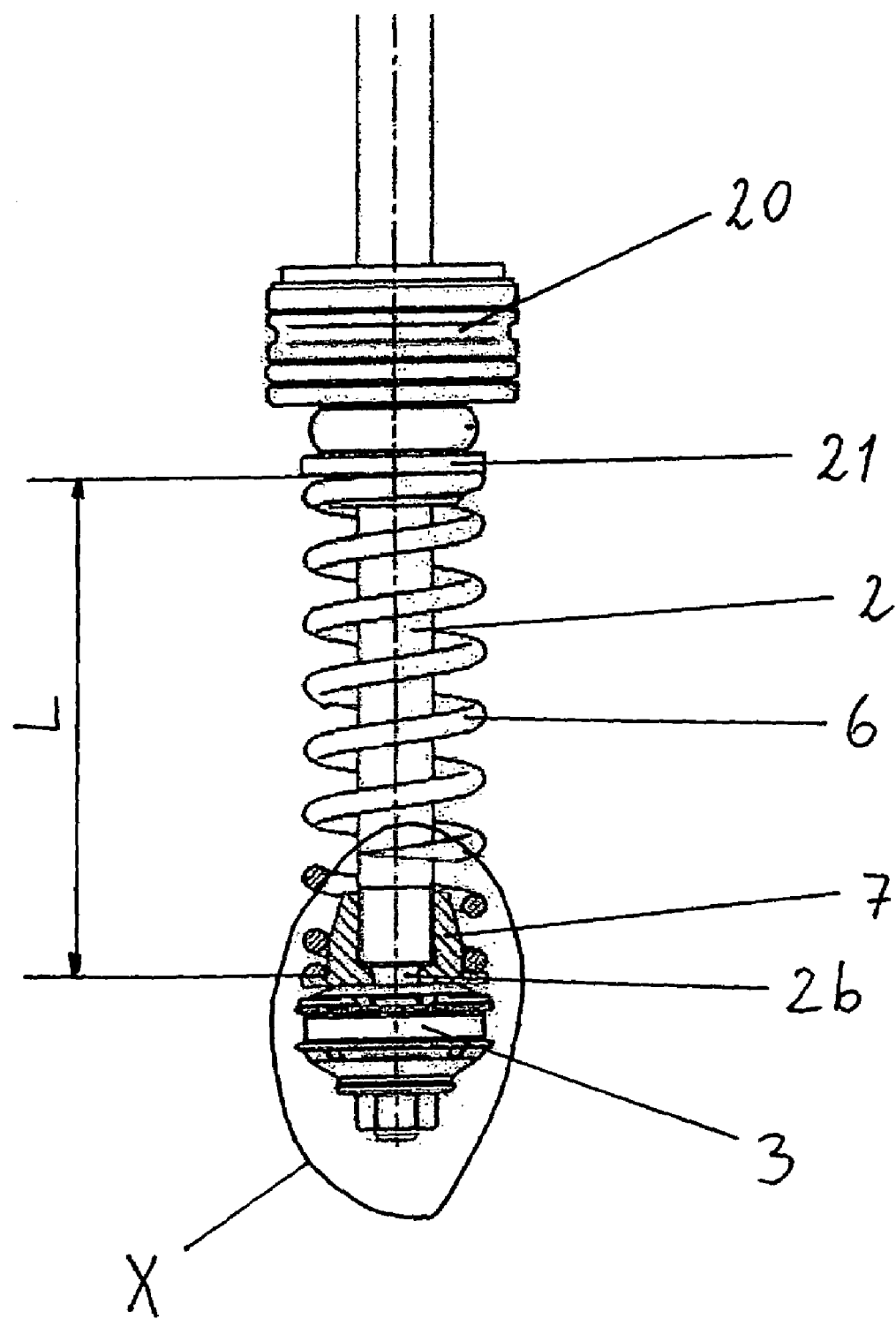
FIG. 1 shows a side, schematic and detailed illustration of an arrangement of a piston rod, working piston, spring collar and buffer spring.

FIG. 1 illustrates an arrangement comprising a piston rod 2 having a piston rod extension 2b, a piston 3, a spring collar 7, a buffer spring 6 and a sealing and guiding unit 20, wherein the damper tube has been left out in order to illustrate the invention more clearly. A support plate 21 is provided on the side of the sealing and guiding unit 20 facing the working piston and the buffer spring 6 is supported against the support plate with its end remote from the working piston.

The axial installation length between the support plate 21 and the first support surface 8 of the spring collar 7 is designated with L in FIG. 1. The point of the invention is to make this axial installation length L as large as possible and simultaneously to ensure that forces and moments exerted by the buffer spring 6 onto the spring collar 7 are introduced directly into the piston rod 2. Owing to the large axial installation space for the buffer spring 6, its length can be maximised in the case of otherwise identical installation conditions so that the required properties of the buffer spring 6 such as for example required block gauge and required spring travel can be set to an optimal value. A large axial covering region is achieved in the invention, in which the spring collar 7 covers/surrounds the piston rod 2 so that the installation space required for accommodating the spring collar is kept small.

Figure 2:
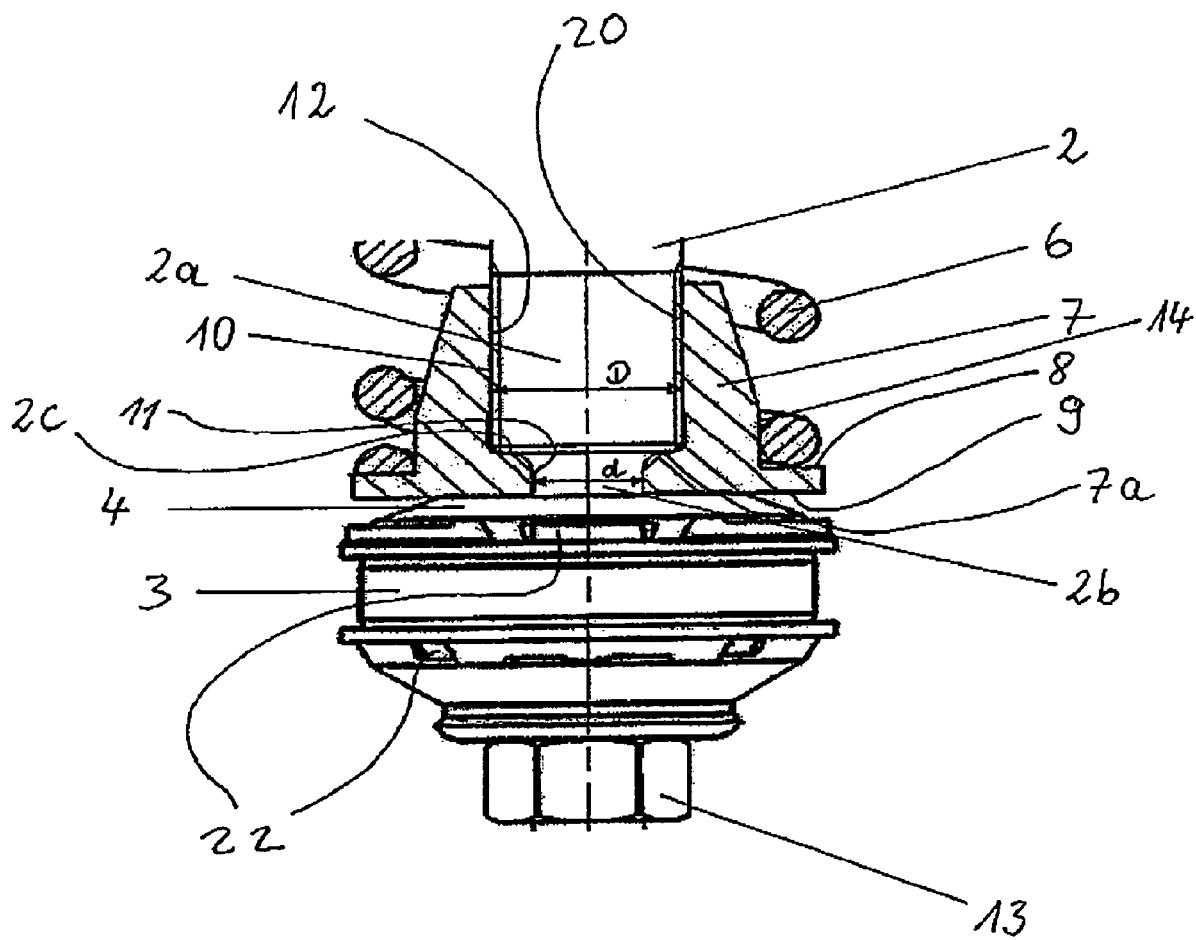
FIG. 2 shows en enlarged side detailed view of the arrangement of FIG. 1.

The region designated with X in FIG. 1 is illustrated in an enlarged manner in FIG. 2. It can be clearly seen that the piston rod 2 has an outer thread at its end 2a. The spring collar 7 comprises a stepped bore 10 which has a first bore section 11 having a small diameter d and a second bore section 12 having a large diameter D. The second bore section 12 has an inner thread which is screwed to the outer thread of the end 2a of the piston rod 2. The inner thread and outer thread threaded together 20 fix together the piston rod 2 and the spring collar 7. The piston 2 is provided with restrictor openings 22. The spring collar 7 optionally includes a key surface (not shown) for attaching a screwing tool such as for example a wrench.

The second bore section 12 comprises a recess at its end facing the first bore section 11. This recess ensures that the spring collar lies with its stop surface 7a against the shoulder 2c of the end 2a of the piston rod 2.

On the working piston-side, the buffer spring 6 is supported against the first support surface 8 of the spring collar 7. Furthermore, the spring collar 7 comprises a second support surface 9 which faces the working piston and against which the spring washers 4 are supported.

The piston 3 is disposed concentrically with respect to the piston rod extension 2b and is braced by means of the piston nut 13 which is screwed onto an outer thread of the piston rod extension. The braced piston 3 is supported on the one hand against the second stop surface 9 of the spring collar 7 and on the other hand against the end side of the piston nut 13 facing the working piston.

It can be clearly seen in FIG. 2 that the spring collar 7 comprises an axially extending support surface for the lowermost winding of the buffer spring 6 formed as a helical spring. The inner thread of the spring collar, by means of which the spring collar is screwed to the end 2a of the piston rod 2, has a pitch oriented in the exact opposite direction to the winding direction of the helical spring.

As can be seen particularly from FIG. 2, the second bore section 12 of the stepped bore 10 of the spring collar 7 and the end 2a of the piston rod 2 are covered in an axial manner to a large extent. This large axial coverage ensures that the axial installation height of the arrangement—consisting of the spring collar 7, the piston rod 2 and the buffer spring 6—is particularly small. Likewise, the fact that the stop surface 7a and the shoulder 2c of the end 2a of the piston rod 2 extend precisely in the radial direction and are not disposed at an angle with respect to the longitudinal axis of the piston rod contributes to reducing the axial installation height.

Figure 3:
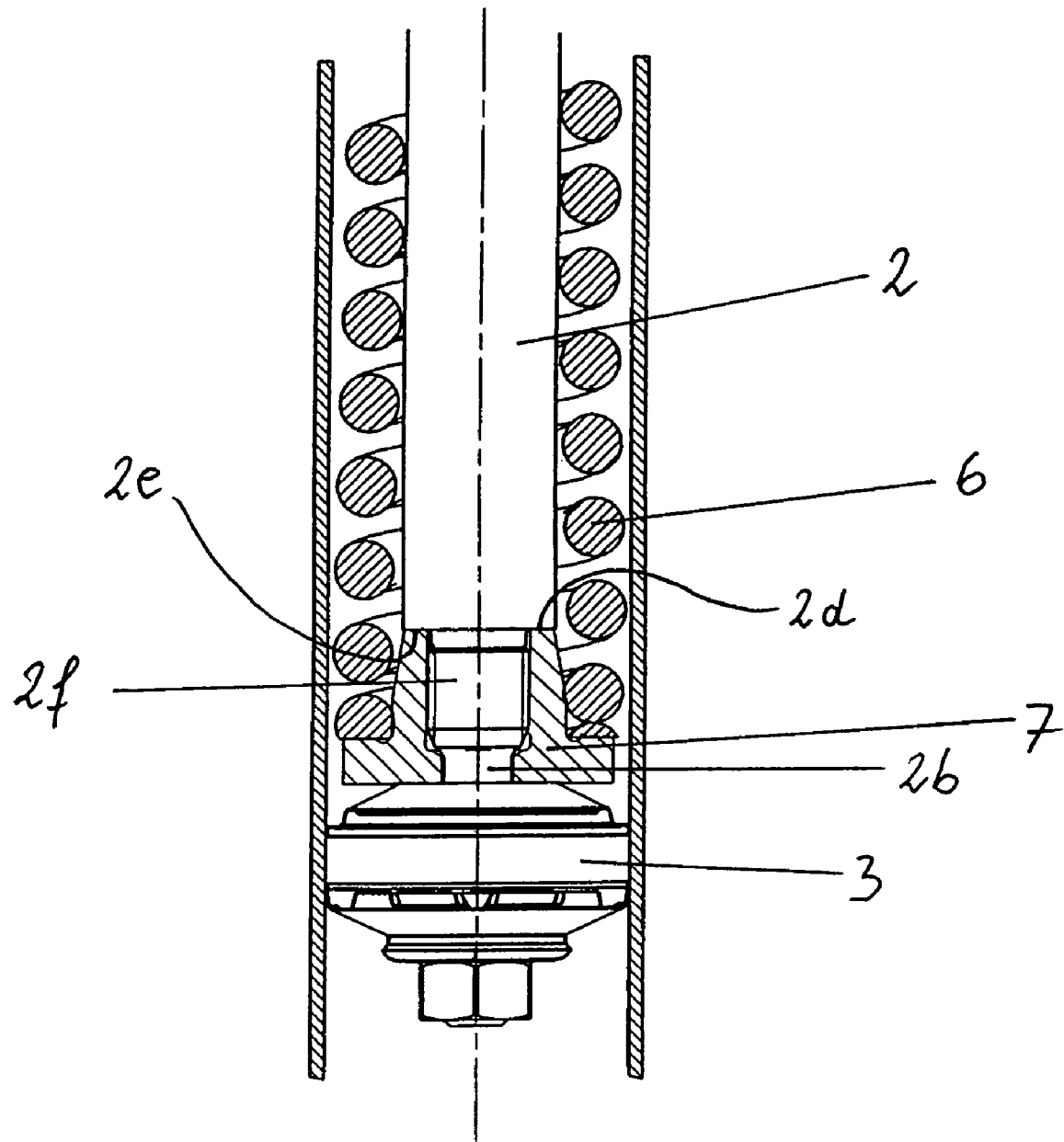
FIG. 3 shows in detail an embodiment of the invention modified with respect to FIGS. 1 and 2.

An embodiment of the invention which is modified with respect to the exemplified embodiment in accordance with FIGS. 1 and 2 is illustrated in FIG. 3. In this embodiment, the spring collar 7 is screwed, by means of its inner thread provided in the bore section 12, onto a piston rod pin 2f having an outer thread. The diameter of the piston rod pin 2f is greatly reduced with respect to the diameter of the piston rod. A radial shoulder 2e is formed by the reduction in diameter of the piston rod 2 to form the piston rod pin 2f provided with the outer thread, wherein the end side 2d, remote from the piston, of the spring collar 7 screwed to the piston rod pin 2f lies against the radial shoulder 2e. In this embodiment of the invention, the spring collar 7 has a very small radial extension. By virtue of the fact that the spring collar 7 is screwed, by means of its inner thread disposed in the bore section 12, onto a piston rod pin 2f reduced in diameter, the spring collar 7 protrudes beyond the radial extension of the piston rod 2 only to a very small radial extent, except with its bearing surface for the buffer spring. The use of a particularly closely wound buffer spring 6 is possible with this embodiment of the invention. In order for the spring collar 7 to be able to lie with its end side 2d, remote from the piston, against the radial shoulder 2e of the piston rod, a recess is provided in the region of the transition from the bore section 12 to the bore section 11.

LIST OF REFERENCE NUMERALS

2. Piston rod
2a End
2b Piston rod extension
2c Shoulder
2d End side
2e Radial shoulder
2f Piston rod pin
3. Piston
4. Spring washer
6. Buffer spring
7. Spring collar
7a Stop surface
8. Support surface
9. Support surface
10. Stepped bore
11. Bore section
12. Bore section
13. Piston nut
14. Guide surface
20. Sealing and guiding unit
21. Support plate
L Axial installation length
d Diameter
D Diameter
X Region

The invention claimed is:

1. A vibration damper comprising:
a damper tube filled with a damping medium;
a piston rod which can move in an oscillating and reciprocal manner in the damper tube, and the piston rod having one end which protrudes into the damper tube and which comprises at said one end a piston rod extension and a shoulder;
a piston which divides an interior of the dumper tube into a working chamber remote from the piston rod and a piston rod-side working chamber and which is disposed coaxially with respect to the piston rod extension, the piston defining restrictor openings communicating with the working chamber and the piston rod-side working chamber;
at least one spring washer adjacent the restrictor openings and disposed in the piston rod-side working chamber;
a buffer spring disposed in the piston rod-side working chamber; and
a spring collar which is disposed in the piston rod-side working chamber and has a first support surface supporting the buffer spring and a second support surface for the spring washer disposed in the piston rod-side working chamber, the spring collar comprising a stepped bore which has a first bore section having a small diameter and a second bore section having a larger diameter, wherein the first bore section is allocated to the piston rod extension and the second bore section is allocated to the end of the piston rod, and the spring collar is rigidly connected to the piston rod in a fixed manner in a first axial direction from the piston rod to the piston rod extension so that a force exerted by the buffer spring onto the spring collar in the first axial direction is introduced directly into the piston rod without transmission through the piston.

2. The vibration damper as claimed in claim 1, wherein the second bore section has an inner thread forms a screw connection with an outer thread provided on the end of the piston rod for attaching the spring collar to the piston rod.

3. The vibration damper as claimed in claim 2, wherein the buffer spring is formed as a helical spring.

4. The vibration damper as claimed in claim 3, wherein the thread of the spring collar, by means of which the spring collar is screwed to the piston rod, has a pitch oriented in the opposite direction to a winding direction of the buffer spring.

5. The vibration damper as claimed in claim 1, wherein the spring collar comprises a stop surface in a transition region from the first to the second bore section, said stop surface lying against shoulder on an end of the piston rod.

6. The vibration damper as claimed in claim 5, wherein the shoulder of the end of the piston rod and the stop surface extend in the radial direction.

7. The vibration damper as claimed in claim 1, wherein the spring collar comprises a guide surface for centering and guiding the buffer spring.

8. The vibration damper as claimed in claim 1, wherein the second bore section of the stepped bore comprises a recess at an end facing the first bore section.

9. The vibration dumper as claimed in claim 1, wherein the piston rod has a radial shoulder, and the spring collar has an end side, remote from the piston, against the radial shoulder of the piston rod.

10. The vibration damper as claimed in claim 1, wherein the piston rod extension has a nut screwed thereon such that the piston is braced between the second support surface of the spring collar and the piston nut.

* * * * *